Dec. 14, 1954  B. F. WILEY  2,697,192
ELECTRIC MOTOR OPERATION
Filed May 11, 1951  2 Sheets-Sheet 1

INVENTOR.
B. F. WILEY
BY Hudson & Young
ATTORNEYS

Dec. 14, 1954       B. F. WILEY       2,697,192
ELECTRIC MOTOR OPERATION
Filed May 11, 1951                    2 Sheets-Sheet 2

INVENTOR.
B. F. WILEY
BY Hudson & Young
ATTORNEYS

United States Patent Office 2,697,192
Patented Dec. 14, 1954

2,697,192

ELECTRIC MOTOR OPERATION

Bruce F. Wiley, Bartlesville, Okla., assignor to Phillips Petroleum Company, a corporation of Delaware Application May 11, 1951, Serial No. 225,871

9 Claims. (Cl. 318—165)

This invention relates to driving means for electric motors, pumps, compressors or the like. In one specific aspect it relates to means for driving an electric motor in a liquid or explosive vapor. In another aspect it relates to torque amplifying operation of electric motors. In still another aspect it relates to improved operation of electric machinery.

Heretofore, considerable difficulty has been encountered in attempting to construct suitable packing means for electric motors so that the motors may efficiently and safely be operated in the region of liquids or explosive vapors, this being especially true when the fluids encountered are under considerable pressure. Whenever a motor is operated in an atmosphere of explosive vapor there is always the danger of an explosion due to sparking at the brushes; and whenever a motor is operated in a liquid, electrical insulating problems are encountered. Although a partial solution to these two problems is found in the various elaborate packing and sealing devices known to the prior art, there has never been a completely satisfactory solution since some seepage has always taken place around the rotating drive shaft. A second known partial solution to the problem has taken the form of various magnetic linkage devices whereby a magnetic armature is driven by means of a second magnetic armature directly rotated by a motor which in turn is sealed in a fluid tight housing. While these devices operate in a satisfactory manner if the fluid is under low pressure, they are not effective at higher pressures since rather thick walls are needed in the housing thereby resulting in undesired flux leakage. It is toward a more complete solution to the problems of efficient and safe operation of electric motors in the presence of liquids and vapors that the present invention is primarily directed.

It is, accordingly, an object of this invention to provide improved means for operating electric motors within fluids.

Another object is to provide an improved form of magnetic drive for electric motors.

A further object is to provide torque amplifying means whereby the output of a first motor is effective to control the operation of a second more powerful motor.

A still further object is to provide improved means for operating electrical machinery.

Various other objects, advantages and features of this invention should become apparent from the following detailed description taken in conjunction with the accompanying drawings illustrating a preferred embodiment of the present invention in which:

Figure 1, shown partially in section, illustrates an induction-type motor and commutator for carrying out this invention;

Figure 1:
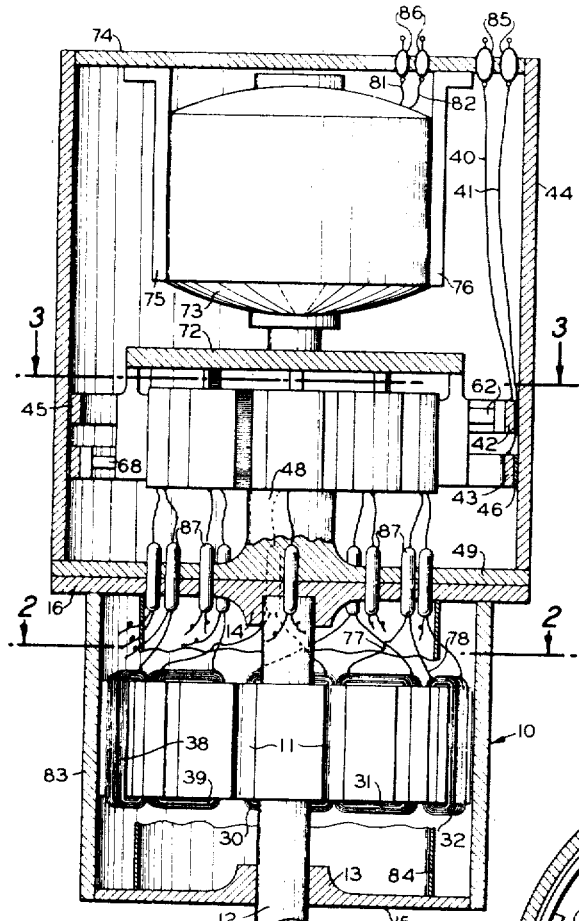
Figure 2:
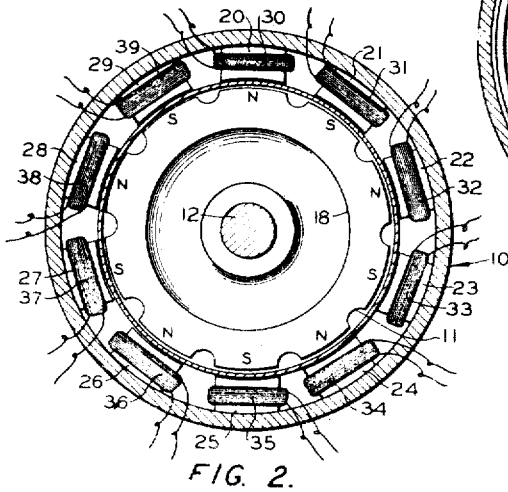
Figure 2 shows a sectional view of the motor assembly taken along line 2—2 in Figure 1.

Referring now to the drawings in detail and to Figures 1 and 2 in particular, there is shown a synchronous-type motor 10 comprising a magnetic rotor 11 formed in a circular ring 18 mounted for rotation on drive shaft 12. Shaft 12 is positioned for rotation on suitable bearings, not shown, in flanged portions 13 and 14 of circular mounting plates 15 and 16, respectively. Rotor 11 is driven by means of a rotating magnetic field set up about pole pieces 20, 21, . . . 29 by field coils 30, 31, . . . 39, respectively.

Figure 3:
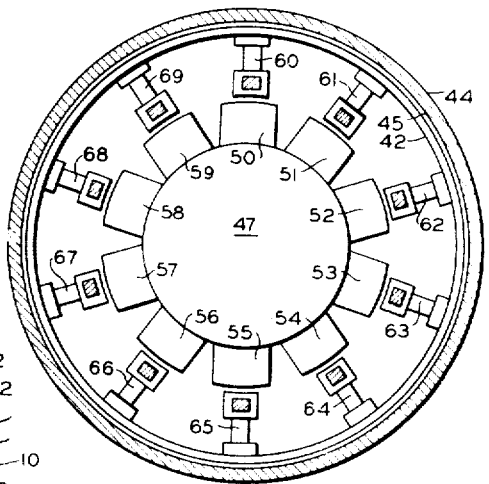
Figure 3 shows a sectional view of the commutator assembly taken along line 3—3 of Figure 1.

Commutator means for establishing the rotating magnetic field about armature 11 is shown in Figures 1 and 3. A direct current voltage source, not shown, is applied through leads 40 and 41 to conducting slip rings 42 and 43, respectively, said slip rings being electrically insulated from cylindrical housing wall 44 by means of circular insulating strips 45 and 46, respectively. Mounted concentric with slip rings 42 and 43 and spaced therefrom are ten metallic commutator segments 50, 51, . . . 59, said segments being electrically insulated from one another and symmetrically mounted on insulating disk 47 which is rigidly secured to extended portion 48 of circular housing wall 49. Also mounted concentric with commutator segments 50, 51, . . . 59 and slip rings 42 and 43, and spaced between said segments and said slip rings, are ten electrically conducting brushes 60, 61, . . . 69. These brushes are fixed to, but insulated from circular plate 72. Plate 72 is rotated by means of motor 73. Motor 73 is attached to circular housing wall 74 by means of suitable brackets such as 75 and 76. Rotating brushes 60, 61, . . . 69 are adapted to make electrical contact between slip rings 42 and 43 and commutator segments 50, 51, . . . 59 in a manner as is described hereinafter. Each individual commutator segment 50, 51, . . . 59 is connected by means of double conductors such as 77 and 78 to opposite terminals of corresponding adjacent coils such as 31 and 32.

The operation of motor 10 can be explained in the following manner. The direct current operating voltage is applied to slip rings 42 and 43 making one positive and the other negative. From these slip rings the voltage is transmitted through brushes 60, 61, . . . 69 to commutator segments 50, 51, . . . 59, and thence to field coils 30, 31, . . . 39. The brushes are positioned so that every other brush, 60, 62, 64, 66, and 68 makes continuous slidable contact with slip ring 42 but does not make contact with slip ring 43, while brushes 61, 63, 65, 67, and 69 make continuous slidable contact with slip ring 43 but do not make contact with slip ring 42. Each individual brush 60, 61, . . . 69 makes slidable contact with each individual commutator segment 50, 51, . . . 59 as each brush moves past said segments. However, the brushes and commutator segments are of such relative size that an individual brush is in contact with only one segment at any given instant. Thus it can be seen that adjacent segments assume potentials of opposite sign at any given instant, and these potentials reverse as the brushes rotate to make contact with adjacent commutator segments. The voltage difference between adjacent segments is applied across corresponding coils 30, 31, . . . 39 so that the magnetic fields set up about adjacent pole pieces are of opposite polarity, said fields reversing in polarity as each individual brush moves to make contact with adjacent segments. Therefore, the direct current operating voltage is utilized to produce a rotating magnetic field about rotor 11, thereby operating motor 10 as a synchronous-type motor through the use of a direct current voltage.

As illustrated in Figure 2, rotor 11 comprises ten outwardly facing magnetic poles, adjacent poles being of opposite polarity. A magnetic armature construction of this type is readily obtainable through the use of modern magnetic alloys such as "Alnico V," the composition of which is 8% aluminum, 14% nickel, 24% cobalt, 3% copper, and 51% iron. While the illustrated rotor construction is highly desirable since the driving torque is large due to the attraction and repulsion of the individual magnets with adjacent field pole pieces, this particular construction is in no way essential to satisfactory operation of the motor. For simplicity the rotor can be constructed of any known magnetic material, preferably laminated to reduce eddy currents, or may be of the squirrel-cage or drag-cup type.

In accordance with an object of this invention to provide means for operating electric motors in the presence of liquids and explosive vapors, there is provided a fluid tight housing around the commutator means and the coils of the motor. The commutator means is effectively sealed within the housing formed by walls 44, 49 and 74. Since there are no rotating shafts passing through these walls they may be constructed completely fluid tight. The only openings that exist in these walls are those through which pass electrical leads such as 40, 41, 81, 82, 77, and 78; and these can be effectively sealed by means of sealing devices which are well known in the art. While motor 10 is illustrated as being enclosed within a chamber formed by walls 15, 16 and 83, the resulting chamber is not completely fluid tight due to the certain clearance required about rotating shaft 12. If motor 10 is operating in a gaseous atmosphere there is no need for further insulation, but if said motor is operated in a liquid, means must be provide for insulating coils 30, 31, . . . 39. This effectively may be done by positioning a fluid-tight cylindrical shell 84 of non-magnetic material between rotor 11 and pole pieces 20, 21, . . . 29. Such a wall prevents liquid seepage into the area enclosing the field coils.

Figure 5:
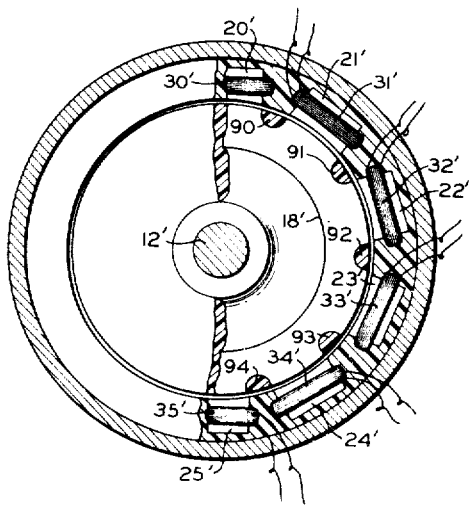
Figure 5 illustrates an optional method of insulating the field coils of the motor shown in Figure 2.

In Figure 5 there is shown a second arrangement by which the field coils represented by 30', 31', . . . 39' can be insulated. In this arrangement a casing of non-magnetic material is formed around said coils and their corresponding pole pieces 20', 21', . . . 29'. Such a casing can conveniently be molded of any of several well known non-magnetic plastic materials. As also illustrated, a similar casing can be applied about rotor 18' so as to present a smooth surface opposing the casing enclosing the pole pieces and field coils. A casing of this sort serves the dual functions of reducing the viscous drag between the moving elements of the motor and protecting the rotor from any corrosive effects of the liquid in which the motor may be operating.

It should be apparent that the motor-commutator arrangement herein described is effective as torque amplifying means. Motor 73, which may be any desired type of electric motor of known construction, is operated through electrical leads 81 and 82. The power output of this motor can be quite small, the only requirement being that the output be sufficient to rotate brushes 60, 61, . . . 69 about commutator segments 50, 51, . . . 59. The primary power for operating motor 10 is supplied from the direct current voltage source through leads 40 and 41, and this power can be of magnitude considerably larger than that required to operate control motor 73. Thus it can be seen that the commutator means described serves as an effective power amplifier in motor operation as well as a motor speed control device. The latter should be apparent since the speed of motor 10 is controlled by the speed of the rotating magnetic field, and this is in turn controlled by the speed of motor 73.

Figure 4:
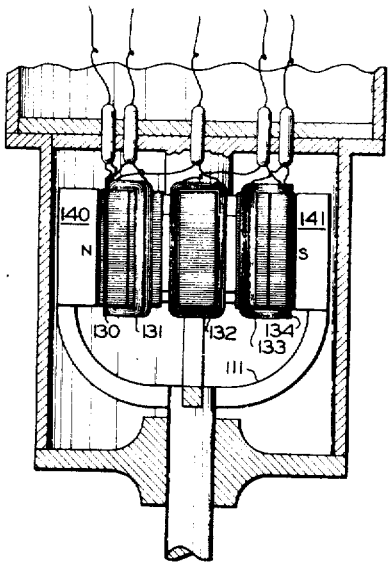
Figure 4 illustrates an optional arrangement of the armature and field coils of a motor similar to that shown in Figure 1.

In Figure 4 there is shown an optional arrangement of the rotor, coils, and pole pieces with respect to one another. Rotor 111 is formed of two opposing magnetic poles 140 and 141 of opposite polarity, and is positioned so as to rotate about the pole pieces rather than inside the pole pieces as shown in Figures 1 and 2. In addition, the number of coils and corresponding pole pieces, is shown as eight rather than ten as previously described. This change in rotor and coil arrangement necessitates a reduction in the number of brushes to two and commutator segments to eight in the corresponding commutator structure. Otherwise, the design of the commutator is the same as that shown in Figures 1 and 3. It should be pointed out that the number of pole pieces and magnetic rotor poles is in no way limited to the particular configurations illustrated, but rather may be of whatever number is convenient and practical for any particular operation. Of course, as is well known, in the electrical motor art the larger the number of pole pieces the smoother the operation of the motor.

Figure 6:
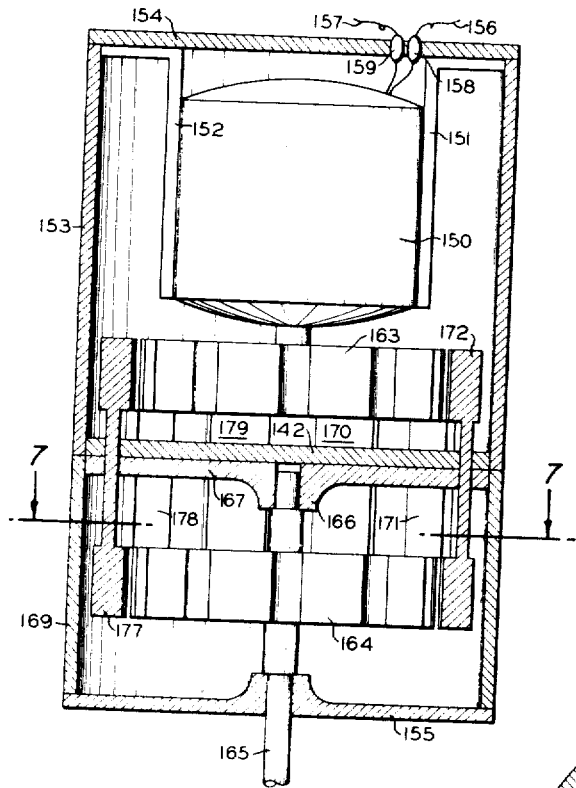
Figure 6 shows an improved form of magnetic drive for an electric motor.
Figure 7:
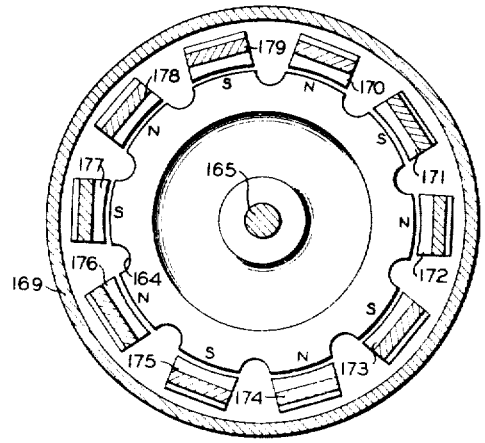
Figure 7 shows a sectional view taken along line 7—7 in Figure 6.

A second form of motor drive is illustrated in Figures 6 and 7 in which the commutating means comprising an armature 163 driven by variable speed motor 150 is positioned within a fluid-tight chamber defined by cylindrical wall 153 and circular plates 142 and 154. Motor 150 is secured to plate 154 by means of brackets such as 151 and 152 and is connected to a power source, not shown, by means of leads 156 and 157 which pass through sealing devices 158 and 159, respectively, through plate 154. Rotor 163 is formed of a plurality of magnetic poles and can have a form such as circular armature 18 of Figure 2. A second rotor 164, identical to armature 163, is mounted on drive shaft 165 which is adapted to rotate in suitable bearings in plate 155 and flanged portion 166 of plate 167. The axis of rotation of rotor 164 is coincident with the axis of rotation of armature 163. A plurality of segments 170, 171, . . . 179 of magnetic material are positioned annularly about armatures 163 and 164 in a manner such that opposite ends of each segment are adjacent corresponding magnetic poles in said rotors. Segments 170, 171, . . . 179 each pass through walls 142 and 167 and are sealed therein to form fluid-tight joints. As rotor 163 is driven by motor 150 a rotating magnetic field is established which is transmitted through segments 170, 171, . . . 179 to armature 164. Armature 164 rotates to "follow" this magnetic field thereby rotating drive shaft 165 which is connected to whatever mechanism is being operated by the motor.

In accordance with this second form of driving means the rotating magnetic field is transmitted through a plurality of segments constructed of magnetic material. The coils have been eliminated thereby reducing the insulating problems that arise from the use of electrical coils in the presence of liquids. The segments, in reducing flux leakage inherent in the prior art devices which transmit magnetic flux through the walls of the fluid-tight housing, and thereby provide for more efficient motor operation. It should be observed that while this feature of the invention has been described in conjunction with a ten pole rotor, satisfactory operation is by no means restricted to this particular configuration.

While this invention has been described in conjunction with a present preferred embodiment thereof this description should be considered as illustrative only and not by way of limitation.

I claim:

1. A motor drive comprising, in combination, a rotor having a plurality of spaced permanent magnetic poles positioned thereon, adjacent poles being of opposite polarity, a fluid-tight housing, motor driven means positioned within said fluid-tight housing to establish a rotating magnetic field, said rotor being positioned outside said housing, and means passing through fluid-tight openings in said housing to establish said rotating magnetic field adjacent said rotor.

2. A motor drive comprising, in combination, a first rotor having a plurality of spaced permanent magnetic poles positioned thereon, adjacent poles being of opposite polarity, a fluid-tight housing, a second similarly constructed rotor positioned within said housing, said first rotor being positioned outside said housing, a motor positioned within said housing to rotate said second rotor, and a plurality of segments of magnetic material magnetically coupling said first rotor to said second rotor whereby said first rotor rotates with said second rotor, said segments passing through fluid-tight openings in said housing.

3. A non-sparking synchronous-type motor comprising, in combination, a rotor, a plurality of coils adjacent said rotor, a direct current voltage source, a commutator, a fluid-tight housing enclosing said commutator, said coils and said rotor being positioned outside said housing, electrical leads connecting said coils to said commutator, said leads passing through fluid-tight openings in said housing.

4. The combination in accordance with claim 3 wherein said coils surround said rotor.

5. The combination in accordance with claim 3 wherein said rotor surrounds said coils.

6. The combination in accordance with claim 3 wherein said rotor comprises a plurality of permanent magnetic poles, said number of poles being equal to the number of said coils, adjacent ones of said poles being of opposite polarity.

7. The combination in accordance with claim 3 further comprising a second fluid-tight housing constructed of non-magnetic material enclosing said coils whereby said rotor is positioned outside said second fluid-tight housing.

8. The combination in accordance with claim 3 further comprising a first fluid-tight casing of non-magnetic material enclosing said rotor, a second fluid-tight casing of non-magnetic material enclosing said coils, said first and second casings being of such configuration that smooth surfaces result between said coils and said rotor thereby reducing the viscous drag therebetween.

9. The combination in accordance with claim 3 wherein said commutator comprises a plurality of electrically conductive segments arranged in a first annular path, said segments being electrically insulated from one another, first and second slip rings positioned in respective annular paths concentric with said first annular path, the terminals of said voltage source being connected to respective ones of said slip rings, a plurality of first brushes, means for rotating said first brushes whereby said first brushes make continuous contact with said first slip ring and make contact with said segments sequentially, a plurality of second brushes, means for rotating said second brushes whereby said second brushes make continuous contact with said second slip ring and make contact with said segments sequentially, said first and second brushes engaging respective adjacent segments at any given time, and electrical leads connecting each of said segments to respective terminals of adjacent pairs of said coils.

References Cited in the file of this patent

UNITED STATES PATENTS

| Number | Name | Date |
|---|---|---|
| 843,287 | MacCoy | Feb. 5, 1907 |
| 1,254,902 | Hale | Jan. 29, 1918 |
| 1,371,096 | Howe et al. | Mar. 8, 1921 |
| 1,598,268 | De Connick | Aug. 31, 1926 |
| 2,327,341 | Drake | Aug. 24, 1943 |
| 2,402,928 | Summers | June 25, 1946 |
| 2,534,520 | Katcher | Dec. 19, 1950 |